United States Patent
Hua et al.

(10) Patent No.: US 8,077,481 B2
(45) Date of Patent: Dec. 13, 2011

(54) PRIMARY SAMPLING CURRENT CONTROLLED SYNCHRONOUS RECTIFYING DRIVE CIRCUIT

(75) Inventors: Guichao Hua, Zhejiang (CN); Wu Xinke, Zhejiang (CN); Luo Changchun, Zhejiang (CN)

(73) Assignee: Inventronics (Hangzhou) Co., Ltd., Hangzhou, Zhejiang (CN)

( * ) Notice: Subject to any disclaimer, the term of this patent is extended or adjusted under 35 U.S.C. 154(b) by 172 days.

(21) Appl. No.: 12/372,178

(22) Filed: Feb. 17, 2009

(65) Prior Publication Data

US 2009/0290397 A1  Nov. 26, 2009

(30) Foreign Application Priority Data

May 21, 2008 (CN) .......................... 2008 1 0062051

(51) Int. Cl.
  *H02M 3/24* (2006.01)
  *H02M 7/217* (2006.01)
(52) U.S. Cl. ..................... 363/15; 363/21.06; 363/21.14; 363/89
(58) Field of Classification Search ............ 363/17, 363/21.04, 21.06, 21.12, 21.14, 89, 127, 363/15
See application file for complete search history.

(56) References Cited

U.S. PATENT DOCUMENTS

| 5,068,776 | A  | * | 11/1991 | Polivka ............................ 363/17 |
| 6,134,131 | A  | * | 10/2000 | Poon et al. .................... 363/127 |
| 6,597,587 | B1 | * | 7/2003  | Poon et al. ................. 363/21.06 |
| 6,671,193 | B1 | * | 12/2003 | Pelkonen ........................ 363/53 |
| 6,940,738 | B2 | * | 9/2005  | Huang et al. .................. 363/127 |
| 7,660,136 | B2 | * | 2/2010  | Yang .......................... 363/21.06 |
| 2004/0165403 | A1 | * | 8/2004 | Crawford ........................ 363/17 |
| 2004/0196669 | A1 | * | 10/2004 | Thrap ............................. 363/19 |
| 2007/0177410 | A1 | * | 8/2007 | Nakamura et al. .......... 363/21.06 |

OTHER PUBLICATIONS

Datasheet for UCC3808. "Low Power Current Mode Push-Pull PWM". Unitrode Products from Texas Instruments. Apr. 1999, Revised Aug. 2002.*

* cited by examiner

*Primary Examiner* — Adolf Berhane
*Assistant Examiner* — Fred E Finch, III
(74) *Attorney, Agent, or Firm* — Terry M. Sanks; Beusse Wolter Sanks Mora & Maire, P.A.

(57) ABSTRACT

A primary winding current controlled synchronous rectifying drive circuit including a current sampling circuit that detects a current signal in a primary winding of a transformer and forwards it to a signal shaping and reset circuit, and a current compensation signal circuit that compensates a magnetizing current in the primary winding of the transformer, wherein the signal shaping and reset circuit converts a sample of the current signal into a voltage signal and shapes it into a pulse signal, and then forwards the current signal to a logic control and power drive circuit that converts the pulse signal into one or more drive signal(s) through logic control, then the drive signal(s) are amplified to drive a corresponding synchronous rectifier.

10 Claims, 4 Drawing Sheets

US 8,077,481 B2

PRIMARY SAMPLING CURRENT CONTROLLED SYNCHRONOUS RECTIFYING DRIVE CIRCUIT

CROSS-REFERENCE TO RELATED APPLICATIONS

This application claims priority of Chinese Patent Application No. 200810062051.1 filed May 21, 2008, which is incorporated herein by reference.

FIELD OF THE INVENTION

The present invention generally relates to a synchronous rectifying drive circuit. More specifically, it relates to a primary sampling current controlled and synchronous rectifying drive circuit.

BACKGROUND OF THE INVENTION

With the rapid development of information technology and an increment in the working frequency of integrated circuits, the demand for low voltage high current power supplies keeps increasing in order to reduce the power consumption of circuits, and as a result, the generated voltage will be decreased to below 1.0 Volts (V). When the output voltage of a power supply decreases, the forward voltage of a diode will increase. For example, the forward voltage of a Fast Recovery Diode (FRD) or a Super-fast Recovery Diode (SRD) could be up to 1.0V to 2.0V. The increment could be approximately 0.6V even for a Schottky diode. As a result, the efficiency of the power supply will be lower. With the development of the synchronous rectifier and corresponding control technology, the application of synchronous rectifying technology is expanding quickly as it helps improve the efficiency, thermal performance, power density, manufacturability and reliability of power supplies.

A current drive synchronous rectifier obtains a drive signal by sampling the current through the synchronous rectifier. The drive signal will be generated when detecting current through the diode of the synchronous rectifier, whereas, the synchronous rectifier will turn off when the current reaches zero, and as a result, the current cannot flow from the drain to the source of the synchronous rectifier. In this way, like a diode, a synchronous rectifier features unilateral conduction, and can be used in various circuitry topologies in power supplying converters. Therefore, current drive synchronous rectifiers have a very bright future. However, prior art current drive synchronous rectifying technology has many drawbacks such as substantial power consumption, complicated circuitry structure, low working frequency, being not easy to control etc., all of which hinder its application.

As shown in prior art FIG. 1, in a current controlled synchronous rectifying drive circuit with energy feedback (such as is illustrated in U.S. Pat. No. 6,597,587), a high frequency current transducer is required to sense the current in the secondary winding of the transformer, and two current transducers are required because full-wave rectification is employed here in the center-tapped secondary winding of the transformer. Moreover, in low voltage high current applications, the high frequency high current loop of the secondary winding incorporates a current transducer, which increases the length and complexity of the current loop and cause more power consumption in the wire and lower efficiency. This not only adds difficulty in the printed circuit board (PCB) layout, but also requires thicker output wire to make the transformer, which further makes the manufacture process complicated and expensive.

SUMMARY OF THE INVENTION

The present invention provides for a current controlled synchronous rectifying drive circuit with high efficiency. A primary winding current controlled synchronous rectifying drive circuit is disclosed having a current sampling circuit that detects a current signal in a primary winding of a transformer and forwards it to a signal shaping and reset circuit, and a current compensation signal circuit that compensates for a magnetizing current in the primary winding of the transformer. The signal shaping and reset circuit converts a sample of the current signal into a voltage signal and shapes it into a pulse signal, and then forwards the current signal to a logic control and power drive circuit that converts the pulse signal into one or more drive signal(s) through logic control, then the drive signal(s) are amplified to drive a corresponding synchronous rectifier.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

Compared with the prior art technology, the circuits in the exemplary embodiments of the present invention is of remarkable practicality and can bring forward considerable economic benefits because they have simpler structure, smaller size, higher efficiency, lower cost, and are very easy to use.

Figure 1:
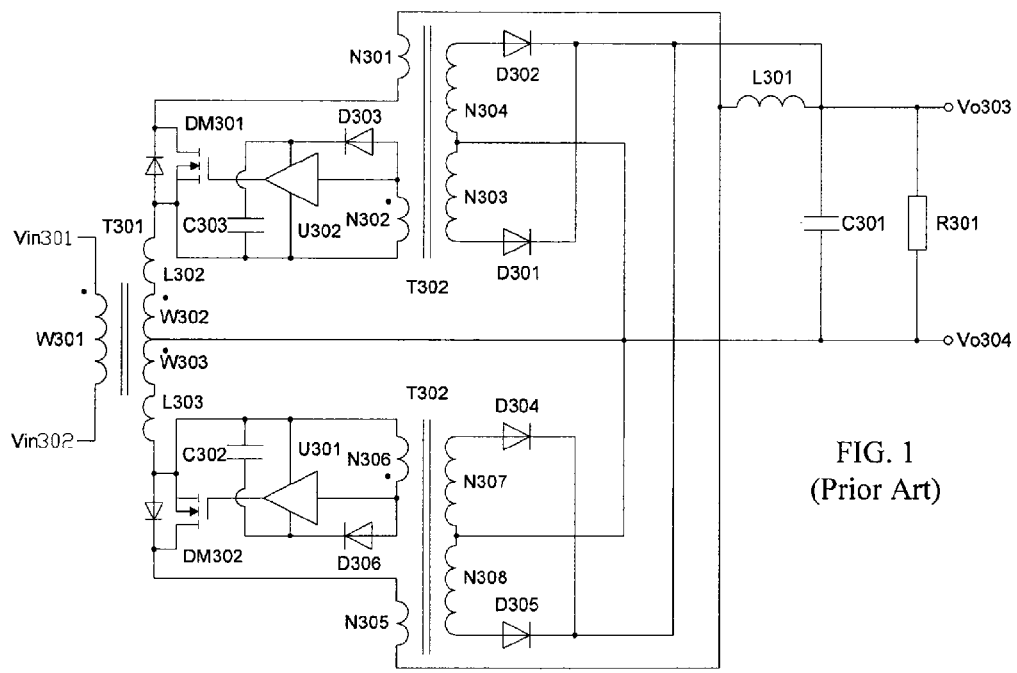
FIG. 1 is a schematic of the current controlled synchronous rectifying drive circuit in prior art.
Figure 2:
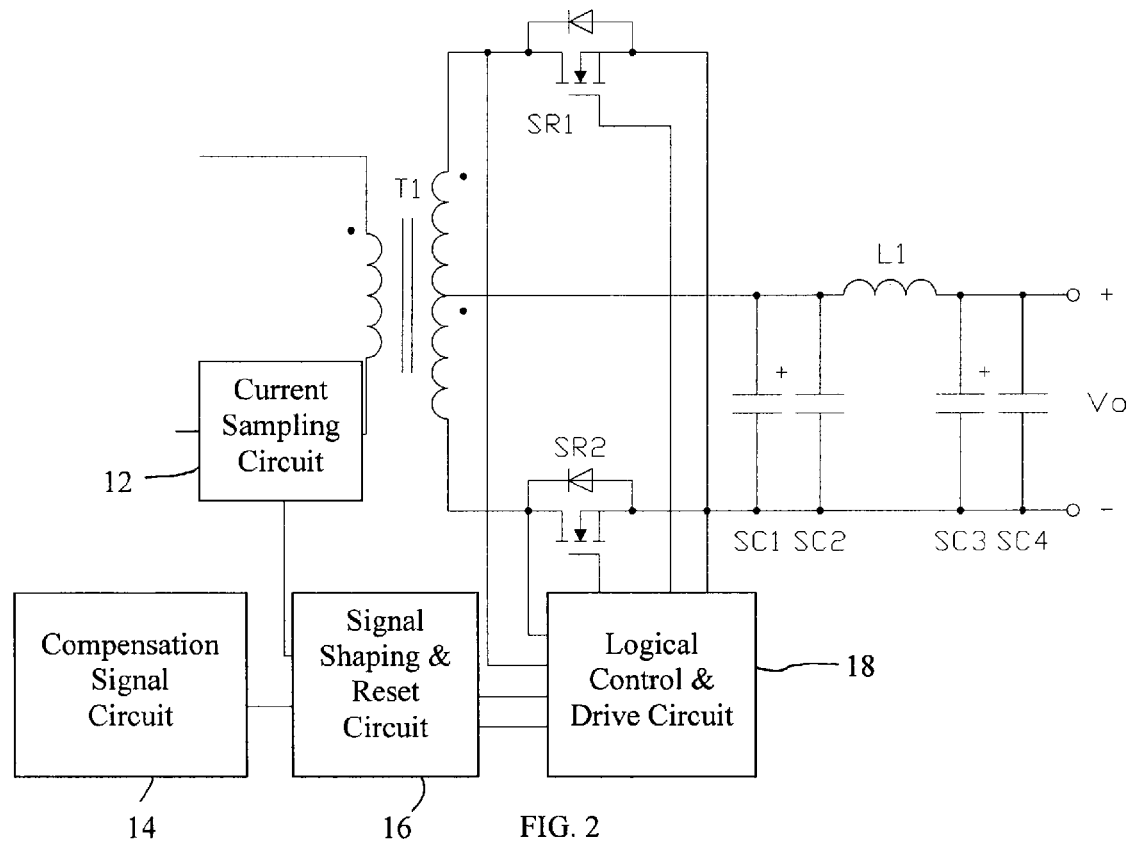
FIG. 2 is a block diagram of the primary sampling current controlled synchronous rectifying drive circuit in the present invention.

As shown in FIG. 2, the primary sampling current controlled synchronous rectifying drive circuit comprises a current sampling circuit 12, a current compensation signal circuit 14, a signal shaping and reset circuit 16, and a logic control and power drive circuit 18 in an exemplary embodiment of the present invention. The current sampling circuit 12 that detects a current signal in a primary winding of a transformer and forwards it to the signal shaping and reset circuit 16 and a current compensation signal circuit 14. The current compensation signal circuit 14 compensates for a current, such as but not limited to a magnetizing current, in the primary winding of the transformer. The signal shaping and reset circuit 16 converts a sample of the current signal into a voltage signal and shapes it into a pulse signal, and then forwards the current signal to the logic control and power drive circuit 18 that converts the pulse signal into one or more drive signal(s) through logic control, then the drive signal(s) are amplified to drive a corresponding synchronous rectifier.

Figure 3:
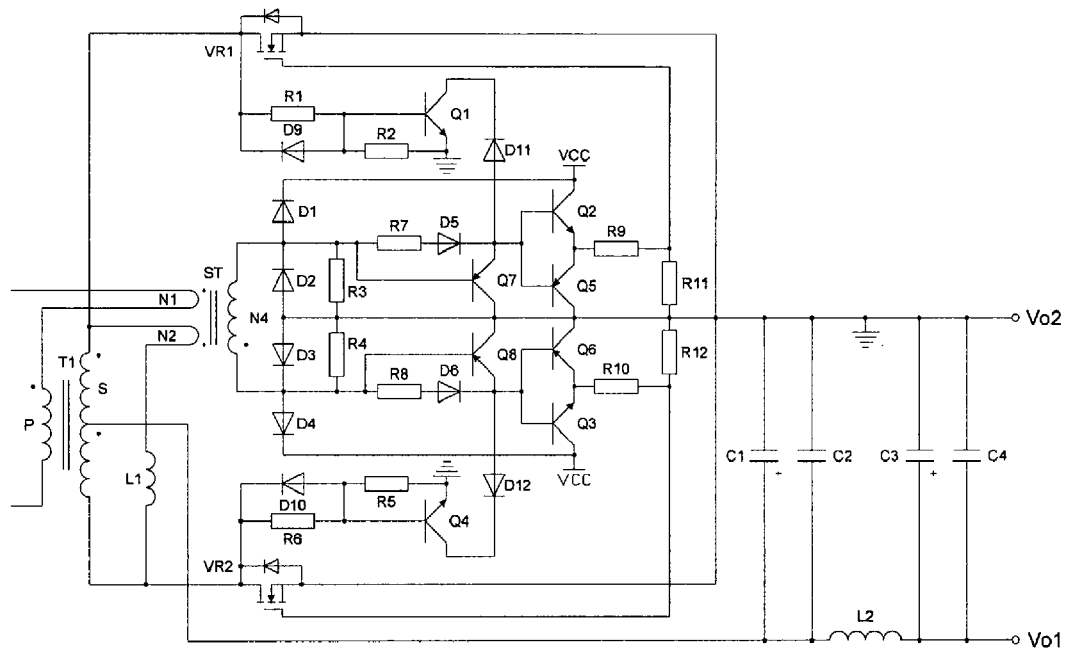
FIG. 3 is a schematic diagram of the primary sampling current controlled synchronous rectifying drive circuit in a first embodiment of the present invention.

As shown in FIG. 3, the current sampling circuit 12 consists of current transducer ST, which further consists of a primary sampling winding N1 for detecting the current signal in the primary winding of the transformer, a compensation winding N2, and a secondary output winding N4. The current compensation circuit uses inductor L1.

The signal shaping and reset circuit 16 consists of diode D1, diode D2, diode D3, diode D4, diode D5, diode D6, resistor R3, resistor R4, resistor R7, resistor R8, transistors Q7 and Q8. The anode of diode D1 is connected to the cathode of resistor D2, as well as to the non-dotted terminal of the output winding N4 of current transducer ST, and to the base of transistor Q7, one end of resistors R3 and R7. The cathode of diode D1 is connected to the Vcc end of a power supply. The anode of diode D2 is connected to the other end of resistor R3, as well as one end of resistor R4, and to the anode of diode D3, the collector of transistors Q7 and Q8. The other end of resistor R7 is connected to the anode of diode D5 while the cathode of diode D5 is connected to the emitter of transistor Q7. The cathode of diode D3 is connected to the dotted terminal of the output winding N4 of current transducer ST, as well as to the anode of diode D4, and the other end of resistor R4, one end of resistor R8, and the base of transistor Q8. The other end of resistor R8 is connected to the anode of diode D6 while the cathode of diode D6 is connected to the emitter of transistor Q8. The cathode of diode 04 is connected to the Vcc end of the power supply.

Inductor L1 is connected in series with the compensation winding N2 of the current transducer and then connected in parallel with the secondary winding S of the transformer Ti. The logic control and power drive circuit 18 comprises two circuits that are in exactly the same structure, controlling synchronous rectifiers VR1 and VR2 respectively.

The circuit which controls the synchronous rectifier VR1 consists of resistors R1, R2, R9, R11, diodes D9, D11, and transistors Q1, Q2 and Q5. One end of resistor R1 is connected to the cathode of diode D9 and the drain of synchronous rectifier VR1. The other end of resistor R1 is connected to the anode of diode D9, one end of resistor R2 and the base of transistor Q1. The other end of resistor R2 is connected to the emitter of transistor 01 and the ground. The collector of transistor Q1 is connected to the cathode of diode D11 while the anode of D11 is connected to the emitter of transistor Q7, and the bases of transistors Q2 and Q5. The collector of transistor Q2 is connected to the Vcc end of the power supply. The emitters of transistors Q2 and Q5 are connected to one end of resistor R9 while the other end of R9 is connected to one end of resistor R11 and the gate of synchronous rectifier VR1.

Resistors R1, R2, diodes D9, D11, and transistor Q1 form a logic control circuit. It logically controls the drive voltage signal which is amplified via transistors Q2 and Q5, resistors R9 and R1 to drive the synchronous rectifier VR1.

The circuit which controls the synchronous rectifier VR2 consists of resistors R5, R6, R10, R12, diodes D10, D12, and transistors Q3, Q4 and Q6. One end of resistor R6 is connected to the cathode of diode D10 and the drain of synchronous rectifier VR2. The other end of resistor R6 is connected to the anode of diode D10, and to one end of resistor R5 and the base of transistor Q4. The other end of resistor R5 is connected to the emitter of transistor Q4 and the ground. The collector of transistor Q4 is connected to the cathode of diode D12 while the anode of D12 is connected to the emitter of transistor Q8, and to the bases of transistors Q3 and Q6. The collector of transistor Q3 is connected to the Vcc end of the power supply. The emitters of transistors Q3 and Q6 are connected to one end of resistor R10 while the other end of RIO is connected to one end of resistor R12 and the gate of synchronous rectifier VR2. The other end of R12 and one end of R11 are connected to ground.

Similarly, resistors R5, R6, diodes D10, D12, and transistor Q4 form into a logic control circuit. It logically controls the drive voltage signal and then has it amplified via transistors Q3 and Q6, resistors R10 and R12 to drive the synchronous rectifier VR2.

Figure 4:
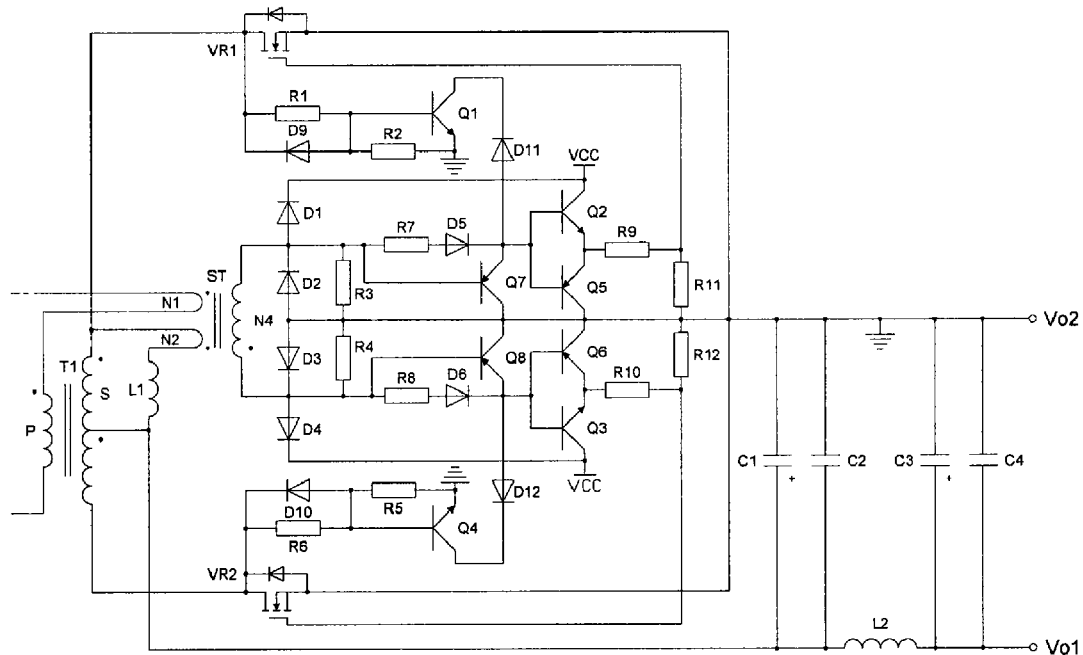
FIG. 4 is a schematic diagram of the primary sampling current controlled synchronous rectifying drive circuit in a second embodiment of the present invention.

FIG. 4 is another embodiment of the present invention. Its structure is exactly the same as that shown in FIG. 3 except that the inductor L1 is only connected to one of the secondary output windings of the transformer Ti.

Figure 5:
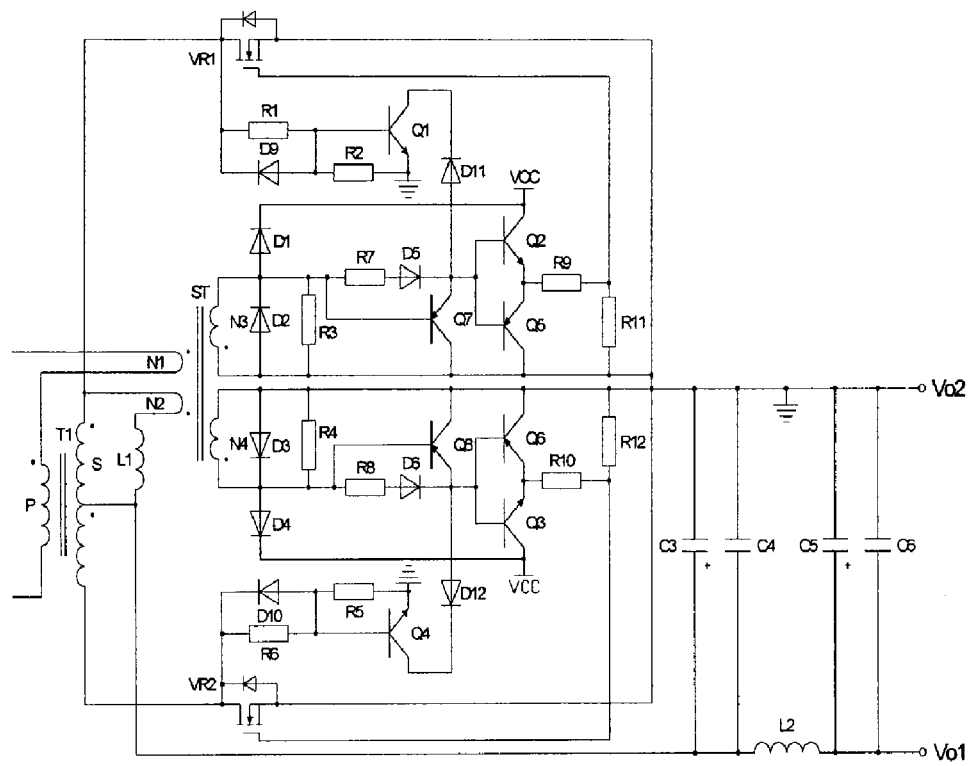
FIG. 5 is a schematic diagram of the primary sampling current controlled synchronous rectifying drive circuit in a third embodiment of the present invention.

FIG. 5 is yet another embodiment of the present invention. The differences between the embodiments of FIG. 4 and FIG. 5 are that the current transducer L1 includes an additional output winding N3, whereas, the signal shaping and reset circuit 16 and the logic control and power drive circuit 18, which control synchronous rectifiers VR1 and VR2 respectively, are connected to the corresponding first output winding N4 and second output winding N3. The remaining circuit shown in FIG. 5 is the same as that shown in FIG. 3.

Figure 6:
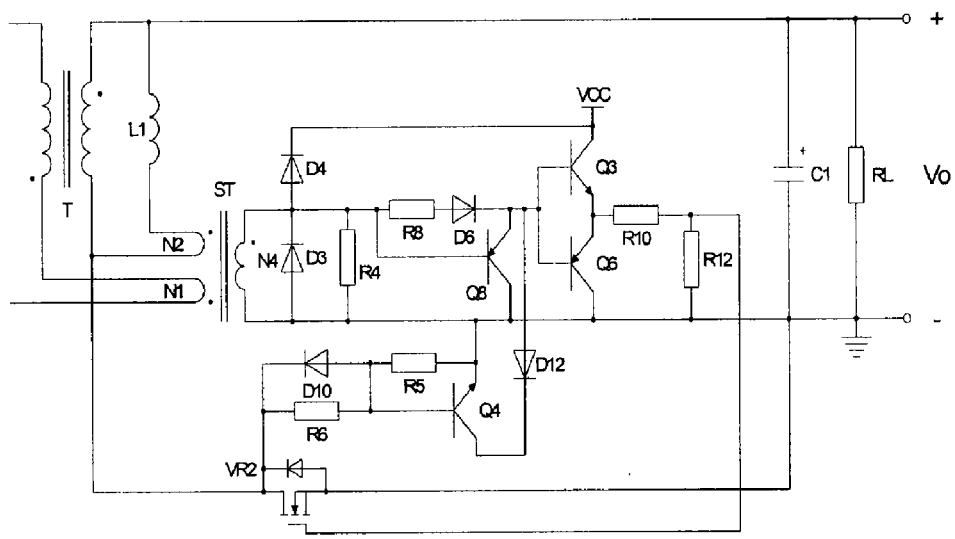
FIG. 6 is a schematic diagram of the primary sampling current controlled synchronous rectifying drive circuit in a fourth embodiment of the present invention.

FIG. 6 is one more embodiment of the present invention. In this embodiment, only the synchronous rectifier VR2 is driven, and this differs from that shown in FIG. 3. The signal shaping and reset circuit 16 consists of diodes D3, D4, D6, and resistors R4, RB and transistor Q8. The anode of diode D3 is connected to the non-dotted end of the output winding N4 of current transducer ST, as well as one end of resistor R4, the collector of transistor Q8 and the ground. The cathode of diode D3 is connected to the dotted end of the output winding N4 of current transducer ST, as well as the anode of diode D4, the base of transistor Q8, the other end of resistor R4 and one end of resistor R8. The other end of RB is connected to the anode of diode D6 while the cathode of D6 is connected to the emitter of transistor Q8. The cathode of diode D4 is connected to the Vcc end of the power supply. The logic control circuit and power drive circuit consists of resistors R5, R6, R0, R12, and diodes D10, D12, and transistors Q3, Q4, and Q6. One end of resistor R6 is connected to the cathode of diode D10 and the drain of synchronous rectifier VR2. The other end of R6 is connected to the anode of diode D10, as well as one end of resistor R5 and the base of transistor Q4. The other end of R5 is connected to the emitter of transistor Q3 and the ground. The collector of transistor Q4 is connected to the cathode of diode D12 while the anode of D12 is connected to the emitter of transistor Q6, and the bases of transistors Q3 and Q6. The collector of transistor Q3 is connected to the Vcc end of the power supply. The emitters of transistors Q3 and Q6 are connected to one end of resistor R10 while the other end of RIO is connected to one end of resistor R12 and the gate of synchronous rectifier VR2. The other end of R2 is connected to the collector of transistor Q6 and the ground.

Figure 7:
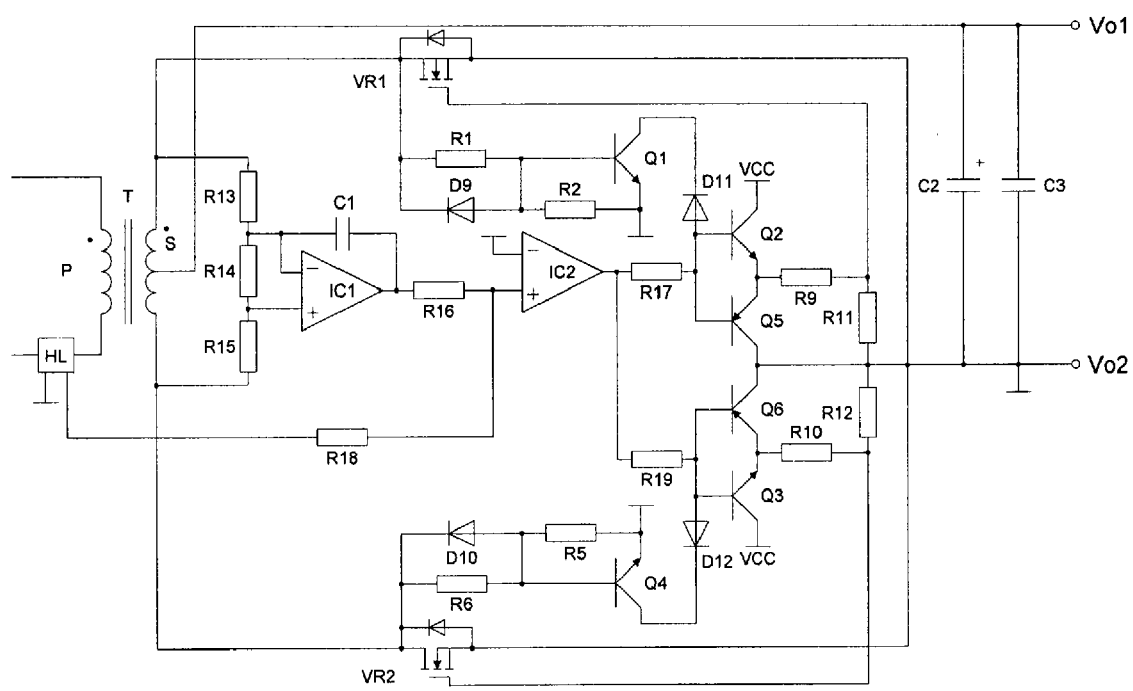
FIG. 7 is a schematic diagram of the primary sampling current controlled synchronous rectifying drive circuit in a fifth embodiment of the present invention.

FIG. 7 is one more embodiment of the present invention. In this embodiment, the current sampling circuit 12 is connected in series with a Hall sensor HL of the primary winding P of the transformer T, which differs from that shown in FIG. 3. The compensation signal circuit 14 consists of resistors R13, R14, R15, capacitor C1 and integrated operational amplifier IC1. One end of resistor R13 is connected to the dotted terminal of the secondary winding S of the transformer while the other end of R13 is connected to one end of resistor R14, one end of capacitor C1 and the positive input terminal of integrated operational amplifier IC1. The negative input terminal of capacitor C1 is connected to the other end of resistor R14 and one end of resistor R15. The other end of R15 is connected to the non-dotted terminal of the secondary winding S of the transformer. Capacitor C1 is connected to the output terminal of integrated operational amplifier IC1.

The signal shaping and reset circuit 16 corresponding to the above-described Hall sensor HL and the current compensation circuit 14 consists of resistors R16, R17, R18, R19, and comparator (integrated operational amplifier) IC2. One end of resistor R16 is connected to the output terminal of the compensation signal circuit 14 while the other end of R16 is connected to one end of resistor R18 and the positive input terminal of comparator 1C2. The other end of R1B is connected to the output of Hall sensor HL. The input terminal of comparator IC2 is connected to the ground while its output terminal is connected to one end each of resistor R17 and R18. The other end each of R17 and R18 is connected to the above-described logic control and power drive circuit 18. The aforesaid logic control and power drive circuit 18 has exactly the same structure as that shown in FIG. 3.

It should be understood that the above mentioned embodiments are just the illumination of the present invention, but not limited to the invention. All extended solutions or substitutions based on the principle and content of this invention should be regarded as Inventors' claims to be protected.

What is claimed is:

1. A primary winding current controlled synchronous rectifying drive circuit, comprising:
    a current sampling circuit that detects a current signal in a primary winding of a transformer (S) and forwards it to a signal shaping and reset circuit; and
    a current compensation signal circuit that compensates a magnetizing current in the primary winding of the transformer;
    wherein the signal shaping and reset circuit converts a sample of the current signal into a voltage signal and shapes it into a pulse signal, and then forwards the current signal to a logic control and power drive circuit that converts the pulse signal into one or more drive signal(s) through logic control, then the drive signal(s) are amplified to drive a corresponding synchronous rectifier;
    wherein the current sampling circuit comprises a current transducer(ST), which comprises a primary sampling winding (N1) for detecting the current signal in the primary winding of the transformer, a compensation winding (N2), and a secondary output winding (N4);
    wherein the current compensation signal circuit comprises the inductor (L1); and
    wherein the inductor (L1) is connected in series with the compensation winding (N2) of the current transducer (ST) and is connected in parallel with any two terminals of a secondary winding (S) of the transformer.

2. The drive circuit of claim 1, wherein the current drive circuit generates two drive signals to drive two synchronous rectifiers respectively, and the signal shaping and reset circuit comprises:
    a first diode (D1), a second diode (D2), a third diode (D3), a fourth diode (D4), a fifth diode (D5), a sixth diode (D6), a third resistor (R3), a fourth resistor (R4), a seventh resistor (R7), a eighth resistor (R8), a seventh transistor (Q7), and an eighth transistor (Q8);
    wherein an anode of the first diode (D1) is connected to a cathode of the second diode (D2), a non-dotted terminal of the output winding (N4) of current transducer (ST), a base of the seventh transistor (Q7) and to one end of the third resistor (R3) and the seventh resistor (R7); a cathode of the first diode (D1) is connected to an end (Vcc) of a power supply;
    wherein an anode of the second diode (D2) is connected to another end of the third resistor (R3) and to one end of the fourth resistor (R4) and to an anode of the third diode (D3) and collectors of the seventh transistor (Q7) and the eighth transistor (Q8);
    wherein another end of the seventh resistor (R7) is connected to an anode of the fifth diode (D5), while a cathode of the fifth diode (D5) is connected to an emitter of the seventh transistor (Q7); wherein a cathode of the third diode (D3) is connected to a dotted terminal of the output winding (N4) of the current transducer (ST), an anode of the fourth diode (D4), another end of the fourth resistor (R4), an end of the eighth resistor (R8) and a base of the eighth transistor (Q8);
    wherein another end of the eighth resistor (R8) is connected to an anode of the sixth diode (D6) while a cathode of the sixth diode (D6) is connected to an emitter of the eighth transistor (Q8);
    wherein a cathode of the fourth diode (D4) is connected to the end (Vcc) of the power supply;
    wherein the logic control and power drive circuit comprises a first resistor (R1), a second resistor (R2), a fifth resistor (R5), a sixth resistor (R6), a ninth resistor (R9), a tenth resistor (R10), an eleventh resistor (R11), a twelfth resistor (R12), a ninth diode (D9), a tenth diode (D10), a eleventh diode (D11), a twelfth diode (D12), and a first transistor (Q1), a second transistor (Q2), a third transistor (Q3), a fourth transistor (Q4), a fifth transistor (Q5), and a sixth transistor (Q6);
    wherein an end of the first resistor (R1) is connected to a cathode of the ninth diode (D9) and a drain of the synchronous rectifier (VR1); and another end of the first resistor (R1) is connected to the an anode of the ninth diode (D9), an end of the second resistor (R2) and a base of the first transistor (Q1) and another end of the second resistor (R2) is connected to an emitter of the first transistor (Q1) and a ground;
    wherein a collector of the first transistor (Q1) is connected to a cathode of the eleventh diode (D11) while an anode of the eleventh diode (D11) is connected to an emitter of the seventh transistor (Q7), and to bases of the second transistor (Q2) and the fifth transistor (Q5);
    wherein a collector of the second transistor (Q2) is connected to the end (Vcc) of the power supply, and a collector of the fifth transistor (Q5) is connected a ground;
    wherein emitters of the second transistor (Q2) and the fifth transistor (Q5) are connected to one end of the ninth resistor (R9), and another end of the ninth resistor (R9) is connected to an end of the eleventh resistor (R11), and a gate of the synchronous rectifier (VR1) while another end of the eleventh resistor (R11) is connected to the ground;
    wherein an end of the sixth resistor (R6) is connected to a cathode of the tenth diode (D10) and a drain of the other synchronous rectifier (VR2), and another end of the sixth resistor (R6) is connected to the an anode of the tenth diode (D10), an end of the fifth resistor (R5) and a base of the fourth transistor (Q4) and another end of the fifth resistor (R5) is connected to an emitter of the fourth transistor (Q4); and a ground; wherein a collector of the fourth transistor (Q4) is connected to a cathode of the twelfth diode (D12) while an anode of the twelfth diode (D12) is connected to an emitter of the eighth transistor (Q8) and to bases of the third transistor (Q3) and the sixth transistor (Q6); and wherein a collector of the third transistor (Q3) is connected to the end of the power supply (Vcc); a collector of the sixth transistor (Q6) is connected to a ground; and emitters of the third transistor (Q3) and the sixth transistor (Q6) are connected to one end of the tenth resistor (R10) while another end of the tenth resistor (R10) is connected to one end of the twelfth resistor (R12) and a gate of the other synchronous rectifier (VR2); and another end of the twelfth resistor (R12) is connected to a collector of the sixth transistor (Q6) and the ground.

3. The drive circuit of claim 1, wherein the current transducer (ST) further comprises an additional output winding (N3).

4. A primary winding current controlled synchronous rectifying drive circuit, comprising:
a current sampling circuit that detects a current signal in a primary winding of a transformer and forwards it to a signal shaping and reset circuit; and
a current compensation signal circuit that compensates a magnetizing current in the primary winding of the transformer;
wherein the signal shaping and reset circuit converts a sample of the current signal into a voltage signal and shapes it into a pulse signal, and then forwards the current signal to a logic control and power drive circuit that converts the pulse signal into one or more drive signal(s) through logic control, then the drive signal(s) are amplified to drive a corresponding synchronous rectifier;
wherein the current sampling circuit is connected in series with a Hall sensor (HL) of the primary winding (P) of the transformer; and
wherein the compensation signal circuit comprises a thirteenth resistor (R13), a fourteenth resistor (R14), a fifteenth resistor (R15), a capacitor (C1) and an integrated operational amplifier (IC1), with an end of the thirteenth resistor (R13) is connected to a dotted terminal of a secondary winding (S) of the transformer while another end of the thirteenth resistor (R13) is connected to an end of the fourteenth resistor (R14), to an end of the capacitor (C1) and to a negative input terminal of the integrated operational amplifier (IC1); and a positive input terminal of (IC1) is connected to the other end of the fourteenth resistor (R14) and an end of the fifteenth resistor (R15); and another end of the fifteenth resistor (R15) is connected to the non-dotted terminal of the secondary winding (S) of the transformer, and the capacitor (C1) is connected to an output terminal of the integrated operational amplifier (IC1).

5. The drive circuit of claim 4, wherein the signal shaping and reset circuit comprise the sixteenth resistor (R16), the seventeenth resistor (R17), the eighteenth resistor (R18), the nineteenth resistor (R19), and a comparator (IC2), and an end of the sixteenth resistor (R16) is connected to the output terminal of the compensation signal circuit while another end of the sixteenth resistor (R16) is connected to an end of the eighteenth resistor (R18) and the positive input terminal of the comparator (IC2), and another end of the eighteenth resistor (R18) is connected to an output of the Hall sensor (HL), and a negative input terminal of the comparator (IC2) is connected to a ground while its output terminal is connected to an end each of the seventeenth resistor (R17) and to an end of the nineteenth resistor (R19).

6. A primary winding current controlled synchronous rectifying drive circuit, comprising:
a current sampling circuit that detects a current signal in a primary winding of a transformer (S) and forwards it to a signal shaping and reset circuit; and
a current compensation signal circuit that compensates a magnetizing current in the primary winding of the transformer;
wherein the signal shaping and reset circuit converts a sample of the current signal into a voltage signal and shapes it into a pulse signal, and then forwards the current signal to a logic control and power drive circuit that converts the pulse signal into one or more drive signal(s) through logic control, then the drive signal(s) are amplified to drive a corresponding synchronous rectifier;
wherein the current sampling circuit comprises a current transducer (ST), which comprises a primary sampling winding (N1) for detecting the current signal in the primary winding of the transformer, a compensation winding (N2), and a secondary output winding (N4);
wherein the current compensation signal circuit comprises the inductor (L1); and
wherein the inductor (L1) is connected in series with the compensation winding (N2) of the current transducer (ST) and is connected in parallel with any two terminal of a secondary winding (S) of the transformer.

7. The drive circuit of claim 6, wherein the current drive circuit generates two drive signals to drive two synchronous rectifiers respectively, and the signal shaping and reset circuit comprises:
a first diode (D1), a second diode (D2), a third diode (D3), a fourth diode (D4), a fifth diode (D5), a sixth diode (D6), a third resistor (R3), a fourth resistor (R4), a seventh resistor (R7), a eighth resistor (R8), a seventh transistor (Q7), and an eighth transistor (Q8);
wherein an anode of the first diode (D1) is connected to a cathode of the second diode (D2), a non-dotted terminal of the output winding (N4) of current transducer (ST), a base of the seventh transistor (Q7) and to one end of the third resistor (R3) and the seventh resistor (R7); a cathode of the first diode (D1) is connected to an end (Vcc) of a power supply;
wherein an anode of the second diode (D2) is connected to another end of the third resistor (R3) and to one end of the fourth resistor (R4) and to an anode of the third diode (D3) and collectors of the seventh transistor (Q7) and the eighth transistor (Q8);
wherein another end of the seventh resistor (R7) is connected to an anode of the fifth diode (D5), while a cathode of the fifth diode (D5) is connected to an emitter of the seventh transistor (Q7); wherein a cathode of the third diode (D3) is connected to a dotted terminal of the output winding (N4) of the current transducer (ST), an anode of the fourth diode (D4), another end of the fourth resistor (R4), an end of the eighth resistor (R8) and a base of the eighth transistor (Q8);
wherein another end of the eighth resistor (R8) is connected to an anode of the sixth diode (D6) while a cathode of the sixth diode (D6) is connected to an emitter of the eighth transistor (Q8);

wherein a cathode of the fourth diode (D4) is connected to the end (Vcc) of the power supply;

wherein the logic control and power drive circuit comprises a first resistor (R1), a second resistor (R2), a fifth resistor (R5), a sixth resistor (R6), a ninth resistor (R9), a tenth resistor (R10), an eleventh resistor (R11), a twelfth resistor (R12), a ninth diode (D9), a tenth diode (D10), a eleventh diode (D11), a twelfth diode (D12), and a first transistor (Q1), a second transistor (Q2), a third transistor (Q3), a fourth transistor (Q4), a fifth transistor (Q5), and a sixth transistor (Q6);

wherein an end of the first resistor (R1) is connected to a cathode of the ninth diode (D9) and a drain of the synchronous rectifier (VR1); and another end of the first resistor (R1) is connected to the an anode of the ninth diode (D9), an end of the second resistor (R2) and a base of the first transistor (Q1) and another end of the second resistor (R2) is connected to an emitter of the first transistor (Q1) and a ground;

wherein a collector of the first transistor (Q1) is connected to a cathode of the eleventh diode (D11) while an anode of the eleventh diode (D11) is connected to an emitter of the seventh transistor (Q7), and to bases of the second transistor (Q2) and the fifth transistor (Q5);

wherein a collector of the second transistor (Q2) is connected to the end (Vcc) of the power supply, and a collector of the fifth transistor (Q5) is connected a ground;

wherein emitters of the second transistor (Q2) and the fifth transistor (Q5) are connected to one end of the ninth resistor (R9), and another end of the ninth resistor (R9) is connected to an end of the eleventh resistor (R11), and a gate of the synchronous rectifier (VR1) while another end of the eleventh resistor (R11) is connected to the ground;

wherein an end of the sixth resistor (R6) is connected to a cathode of the tenth diode (D10) and a drain of the other synchronous rectifier (VR2), and another end of the sixth resistor (R6) is connected to the an anode of the tenth diode (D10), an end of the fifth resistor (R5) and a base of the fourth transistor (Q4) and another end of the fifth resistor (R5) is connected to an emitter of the fourth transistor (Q4); and a ground; wherein a collector of the fourth transistor (Q4) is connected to a cathode of the twelfth diode (D12) while an anode of the twelfth diode (Q12) is connected to an emitter of the eighth transistor (Q8) and to bases of the third transistor (Q3) and the sixth transistor (Q6); and wherein a collector of the third transistor (Q3) is connected to the end (Vcc) of the power supply; a collector of the sixth transistor (Q6) is connected to a ground; and emitters of the third transistor (Q3) and the sixth transistor (Q6) are connected to one end of the tenth resistor (R10) while another end of the tenth resistor (R10) is connected to one end of the twelfth resistor (R12) and a gate of the other synchronous rectifier (VR2); and another end of the twelfth resistor (R12) is connected to a collector of the sixth transistor (Q6) and the ground.

8. The drive circuit of claim 6, wherein the current transducer (ST) further comprises an additional output winding (N3).

9. A primary winding current controlled synchronous rectifying drive circuit, comprising:

a current sampling circuit that detects a current signal in a primary winding of a transformer and forwards it to a signal shaping and reset circuit; and a current compensation signal circuit that compensates a magnetizing current in the primary winding of the transformer;

wherein the signal shaping and reset circuit converts a sample of the current signal into a voltage signal and shapes it into a pulse signal, and then forwards the current signal to a logic control and power drive circuit that converts the pulse signal into one or more drive signal(s) through logic control, then the drive signal(s) are amplified to drive a corresponding synchronous rectifier;

wherein the current sampling circuit is connected in series with a Hall sensor (HL) of the primary winding (P) of the transformer; and wherein the compensation signal circuit comprises a thirteenth resistor (R13), a fourteenth resistor (R14), a fifteenth resistor (R15), a capacitor (C1) and an integrated operational amplifier (IC1), with an end of the thirteenth resistor (R13) is connected to a dotted terminal of a secondary winding (S) of the transformer while another end of the thirteenth resistor (R13) is connected to an end of the fourteenth resistor (R14), to an end of the capacitor (C1) and to a negative input terminal of the integrated operational amplifier (IC1); and a positive input terminal of (IC1) is connected to the other end of the fourteenth resistor (R14) and an end of the fifteenth resistor (R15); and another end of the fifteenth resistor (R15) is connected to the non-dotted terminal of the secondary winding (S) of the transformer, and the capacitor (C1) is connected to an output terminal of the integrated operational amplifier (IC1).

10. The drive circuit of claim 9, wherein the signal shaping and reset circuit comprise the sixteenth resistor (R16), the seventeenth resistor (R17), the eighteenth resistor (R18), the nineteenth resistor (R19), and a comparator (IC2), and an end of the sixteenth resistor (R16) is connected to the output terminal of the compensation signal circuit while another end of the sixteenth resistor (R16) is connected to an end of the eighteenth resistor (R18) and the positive input terminal of the comparator (IC2), and another end of the eighteenth resistor (R18) is connected to an output of the Hall sensor (HL), and a negative input terminal of the comparator (IC2) is connected to a ground while its output terminal is connected to an end each of the seventeenth resistor (R17) and to an end of the nineteenth resistor (R19).

* * * * *